United States Patent
Dixon et al.

(10) Patent No.: US 6,429,402 B1
(45) Date of Patent: Aug. 6, 2002

(54) CONTROLLED LASER PRODUCTION OF ELONGATED ARTICLES FROM PARTICULATES

(75) Inventors: Raymond D. Dixon; Gary K. Lewis, both of Los Alamos; John O. Milewski, Santa Fe, all of NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/587,183

(22) Filed: Jun. 2, 2000

Related U.S. Application Data

(63) Continuation-in-part of application No. 08/864,136, filed on May 28, 1997, now abandoned.
(60) Provisional application No. 60/036,399, filed on Jan. 24, 1997.

(51) Int. Cl.⁷ .................................................. H05B 1/00
(52) U.S. Cl. ............................ 219/121.63; 219/121.64; 219/121.82
(58) Field of Search ........................ 219/121.6, 121.63, 219/121.64, 121.65, 121.66, 121.78, 121.82, 121.85

(56) References Cited

U.S. PATENT DOCUMENTS

| | | | |
|---|---|---|---|
| 4,323,756 A | 4/1982 | Brown et al. | 219/121 LF |
| 4,586,158 A | 4/1986 | Brandle | 364/900 |
| 4,603,257 A | 7/1986 | Packer et al. | 250/358.1 |
| 4,665,492 A | 5/1987 | Masters | 364/468 |
| 4,724,299 A | 2/1988 | Hammeke | 219/121 L |
| 4,743,733 A | 5/1988 | Mehta et al. | 219/212 LF |
| 4,863,538 A | 9/1989 | Deckard | 156/62.2 |
| 4,938,816 A | 7/1990 | Beaman et al. | 156/62.2 |
| 4,944,817 A | 7/1990 | Bourell et al. | 156/62.2 |
| 5,017,753 A | 5/1991 | Deckard | 219/121.63 |

(List continued on next page.)

FOREIGN PATENT DOCUMENTS

| | | |
|---|---|---|
| EP | 0 490 146 A2 | 11/1991 |
| GB | 2 227 964 A | 2/1990 |
| GB | 0 370 967 A1 | 5/1990 |
| JP | 64-87713 | 3/1989 |

OTHER PUBLICATIONS

Alonso R and Korth HF, Database System Issues in Nomadic Computing, *Proceedings of 1993 ACM SIGMOD Conference*, May 1993.

Alonso R and Mani VS, A Pen–based Database Interface for Mobile Computers, *Proceedings of IEEE Computer Society Workshop on Mobile Computing Systems and Applications*, Dec. 1994.

Asthana A et al., An Indoor Wireless System for Personalized Shopping Assistance, *Proceedings of IEEE Computer Society Workshop on Mobile Computing Systems and Applications*, Dec. 1994.

Krishnakumar N and Jain R, Mobility Support for Sales and Inventory Applications, *Mobile Computing (AT&T Bell Laboratories)*, 1996.

(List continued on next page.)

*Primary Examiner*—Samuel M. Heinrich
(74) *Attorney, Agent, or Firm*—Gemma Morrison Bennett

(57) ABSTRACT

It has been discovered that wires and small diameter rods can be produced using laser deposition technology in a novel way. An elongated article such as a wire or rod is constructed by melting and depositing particulate material into a deposition zone which has been designed to yield the desired article shape and dimensions. The article is withdrawn from the deposition zone as it is formed, thus enabling formation of the article in a continuous process. Alternatively, the deposition zone is moved along any of numerous deposition paths away from the article being formed.

34 Claims, 12 Drawing Sheets

U.S. PATENT DOCUMENTS

| | | | |
|---|---|---|---|
| 5,038,014 A | 8/1991 | Pratt et al. | 219/121.64 |
| 5,043,548 A | 8/1991 | Whitney et al. | 219/121.47 |
| 5,111,021 A | 5/1992 | Joyls et al. | 219/121.6 |
| 5,132,143 A | 7/1992 | Deckard | 427/197 |
| 5,135,695 A | 8/1992 | Marcus | 264/141 |
| 5,155,324 A | 10/1992 | Deckard et al. | 219/121.64 |
| 5,160,822 A | 11/1992 | Aleshin | 219/121.63 |
| 5,165,030 A | 11/1992 | Barker | 395/500 |
| 5,179,700 A | 1/1993 | Aihara et al. | 395/650 |
| 5,182,430 A | 1/1993 | Lagain | 219/121.63 |
| 5,187,787 A | 2/1993 | Skeen et al. | 395/600 |
| 5,245,155 A | 9/1993 | Pratt et al. | 219/121.63 |
| 5,252,264 A | 10/1993 | Forderhase et al. | 264/22 |
| 5,278,978 A | 1/1994 | Demers et al. | 395/600 |
| 5,327,529 A | 7/1994 | Fults et al. | 395/155 |
| 5,339,434 A | 8/1994 | Rusis | 395/700 |
| 5,347,477 A | 9/1994 | Lee | 364/709.11 |
| 5,412,772 A | 5/1995 | Monson | 395/155 |
| 5,418,350 A | 5/1995 | Freneaux et al. | 219/121.84 |
| 5,493,671 A | 2/1996 | Pitt et al. | 395/500 |
| 5,513,342 A | 4/1996 | Leong et al. | 395/157 |
| 5,530,221 A | 6/1996 | Benda | 219/121.83 |
| 5,596,744 A | 1/1997 | Dao et al. | 395/610 |
| 5,607,730 A | 3/1997 | Ranalli | 427/512 |
| 5,612,099 A | 3/1997 | Thaler | 427/565 |
| 5,647,931 A | 7/1997 | Retallick et al. | 156/73.6 |
| 5,666,553 A | 9/1997 | Crozier | 395/803 |
| 5,668,959 A | 9/1997 | Malcolm | 345/333 |
| 5,701,423 A | 12/1997 | Crozier | 395/335 |
| 5,708,828 A | 1/1998 | Coleman | 395/785 |
| 5,760,772 A | 6/1998 | Austin | 345/342 |
| 5,767,833 A | 6/1998 | Vanderwiele et al. | 345/132 |
| 5,790,809 A | 8/1998 | Holmes | 395/200.58 |
| 5,792,659 A | 8/1998 | Janay et al. | 435/418 |
| 5,831,609 A | 11/1998 | London et al. | 345/333 |
| 5,832,489 A | 11/1998 | Kucala | 707/10 |
| 5,837,960 A | 11/1998 | Lewis et al. | 219/121.63 |
| 5,867,153 A | 2/1999 | Grandcolas et al. | 345/326 |
| 5,884,323 A | 3/1999 | Hawkins et al. | 707/201 |
| 5,884,325 A | 3/1999 | Bauer et al. | 707/201 |
| 5,889,516 A | 3/1999 | Hickey et al. | 345/333 |
| 5,897,644 A | 4/1999 | Nielsen | 707/513 |
| 5,926,816 A | 7/1999 | Bauer et al. | 707/8 |
| 5,961,862 A | 10/1999 | Lewis | 219/121.84 |
| 5,970,501 A | 10/1999 | Hunkins et al. | 707/200 |
| 5,983,247 A | 11/1999 | Yamanaka et al. | 707/526 |
| 6,000,000 A | 12/1999 | Hawkins et al. | 707/201 |
| 6,006,274 A | 12/1999 | Hawkins et al. | 709/248 |
| 6,023,708 A | 2/2000 | Mendez et al. | 707/203 |

OTHER PUBLICATIONS

Lei H et al., DataX: an Approach to Ubiquitous Database Access, *Second IEEE Workshop on Mobile Computing Systems and Applications*, Feb. 1999.

Frenk, A. and J. D. Wagniere, "Laser Cladding with Cobalt–Based Hardfacing Alloys," Journal de Physique V, vol. 1, C7–65 through C7–68, Dec. 1991.

Jasim, K. M. et al., "Thermal Barrier Coatings Produced by Laser Cladding," Journal of Materials Science, vol. 25, 4943–4948, 1990.

Subramanian, R. et al., "Laser Cladding of Zirconium on Magnesium for Improved Corrosion Properties," Journal of Materials Science, vol. 26, 951–956, 1991.

Damborenea, J. De et al, "Laser Cladding of High Temperature Coatings," Journal of Materials Science, vol. 28, 4775–4780, 1993.

Mazumder, J. et al., "Solid Solubility in Laser Cladding," Journal of Metals, Feb.18–23 1987.

Kizaki, Yoshimi et al., "Phenomenolgical Studies in Laser Cladding. Part 1. Time–Resolved Measurements of the Absorptivity of Metal Powder," Jpn. J. Appl. Phys., vol. 32, 205–212, Jan. 1993.

Kizaki Yoshimi et al., "Phenomenological Studies in Laser Cladding. Part 2. Thermometrical Experiments on the Melt Pool," Jpn. J. Appl. Phys., vol. 32, 213–220, Jan. 1993.

Schanwald, L. Paul, "Two Powder Stream Diagnostics for Laser Deposition Processes," Sandia National Laboratories/ Department 1831, Albuquerque, NM 87185 (applicants do not yet have publication date or other name of publication).

Schanwald, L. Paul, "Two Thermal Monitors for High Power Laser Processing," Sandia National Laboratories/ Department 1332, Albuquerque, NM 87185, published Nov. 13, 1995 ICALEO '95 Proceedings.

Keicher, D. M. et al., "Overview: The Laser Forming of Metallic Components Using Particulate Materials," JOM, vol. 49, No. 5, May 1997.

Lewis, Gary K. (editor), "Directed Light Fabrication," Los Alamos National Laboratory, Jun. 1996.

Marcus, Harris L. et al., "From Computer to Component in 15 Minutes: The Integrated Manufacture of Three–Dimensional Objects," Journal of Metals, Apr. 1990.

Marcus, Harris L. et al., "Solid Freeform Fabrication: Powder Processing," Ceramic Bulletin, vol. 69, No. 6, 1990.

R and D Magazine Award Announcement, Sep. 1994 (2 Pages), Los Alamos National Laboratory.

Dateline Los Alamos, Sep. 1994 (2 pages). Distributed by Los Alamos National Laboratory.

Synopsis "Directed Light Fabrication" and Transmittal Letter (3 pages). Undated, handed out after publications of the documents.

Abstract "Directed Light Fabrication." For ICALEO '94, 13th International Congress on Applications of Laser and Electro–Optics. Oct. 17–20, 1994.

Lewis, Gary K., "Direct Laser Metal Deposition Process Fabricates Near–Net–Shape Components Rapidly," Materials Technology, vol. 10, Nos. 3–4, Mar./Apr. 1995.

Kruth, J. P. et al., "Direct Production of Metallic Parts by Rapid Prototyping," Proceedings of the 12th International Congress (LASER '95).

Xin, Chin et al., "Maximum Thickness of the Laser Cladding," Key Engineering Materials, vol. 46 & 47, 381–386, 1990.

Mazumder, J. et al., "Research Summary: The Direct Metal Deposition of H13 Tool Steel for 3–D Components," JOM, vol. 49, No. 5, May 1997.

Video Tape, "Directed Light Fabrication of Complex Metal Parts (DLF)," Dec. 1, 1994, Los Alamos, National Laboratory.

Video Tape, "Directed Light Fabrication R&D 100 Awards," Jan. 6, 1995, Los Alamos National Laboratory.

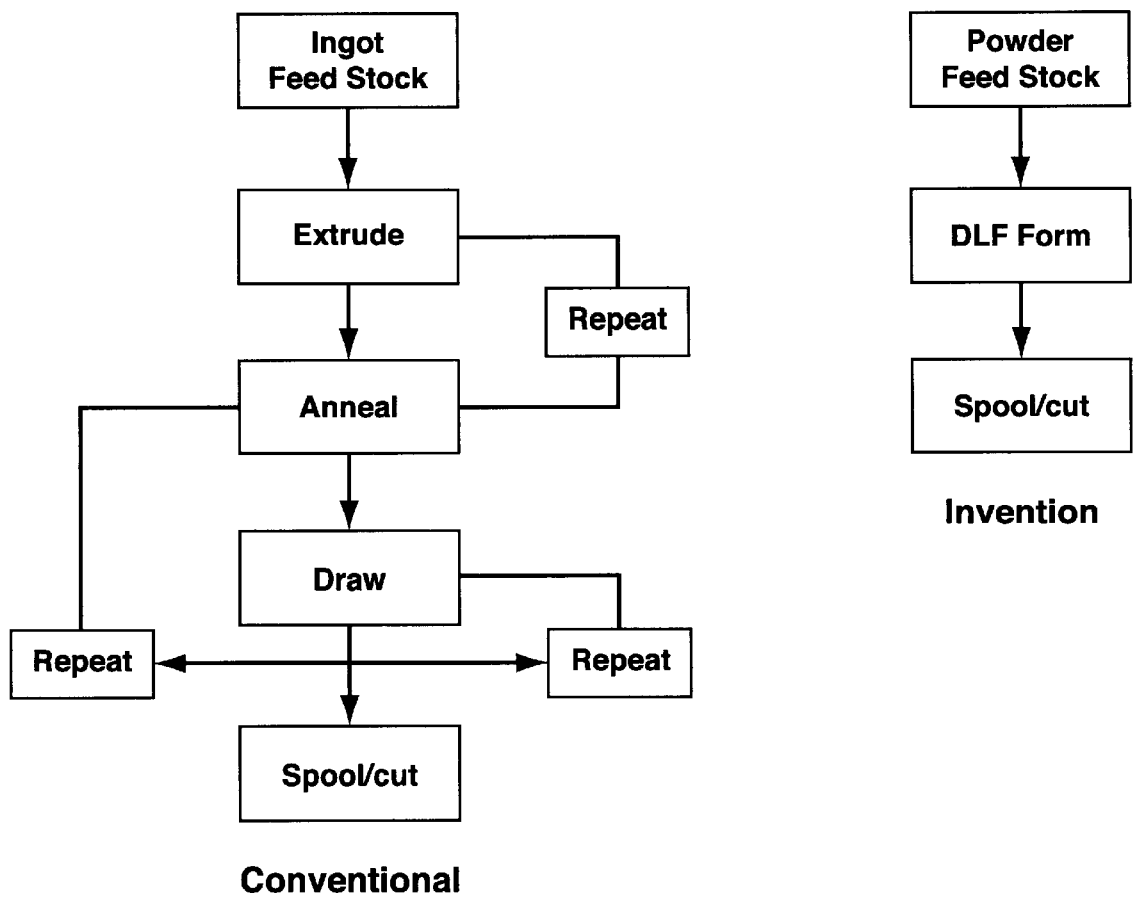
*Fig. 7a*  *Fig. 7b*

CONTROLLED LASER PRODUCTION OF ELONGATED ARTICLES FROM PARTICULATES

This application claims the benefit of U.S. Provisional Application No. 60/036,399 filed Jan. 24, 1997 and is a continuation in part of Nonprovisional Application No. 08/864,136 filed May 28, 1997, now abandoned.

This invention was made with government support under Contract No. W-7405-ENG-36 awarded by the U.S. Department of Energy. The government has certain rights in the invention.

TECHNICAL FIELD

This invention relates to the fabrication of wire from particulate matter. This invention relates more particularly to the fabrication of wire from particulate matter using laser deposition technology.

BACKGROUND ART

Wire has been made by melting the metal or alloy from which the wire is to be formed, casting an ingot from the molten metal or alloy, processing the ingot in a rolling mill, and drawing the rolled metal or alloy through a forming die into the desired wire diameter. Extrusion process for making wire are also available. These methods generally require use of heavy equipment and tools, heat treatments for casting, forging, drawing, or extruding or both, and annealing. The traditional methods also generally require many iterative sequences of steps to achieve the final diameters of wire.

The types of material from which the wire can be made by traditional multi-step processes are also limited to metals or alloys which can be plastically deformed and extruded and economically processed by these methods. Brittle, low ductility materials do not easily lend themselves to deformation processing. Expensive wire drawing dies are subject to abrasion in using traditional manufacturing methods to make wire of hard or abrasive materials.

Conventional processing of metals or alloys into wires can result in contamination which can significantly affect the mechanical or metallurgical properties of the finished wires.

There have been developed methods of making articles using metal powder melted by a laser beam, as disclosed in U.S. Pat. No. 4,724,299. U.S. Pat. No. 5,111,021 discloses addition of material to a surface using a laser beam and metal powder. Although these patents disclose cladding or encrusting existing surfaces on articles, they do not disclose formation of defined wire.

U.S. Pat. No. 4,743,733 discloses repair of an article by directing a laser beam and a stream of metal powder to a region of the article which needs repair. These repair methods rely on support of the molten pool by a previously existing substrate of the article being repaired.

U.S. Pat. No. 4,323,756 discloses a method for producing complex metallic articles from metal powders and substrates which become part of the articles. A focused energy beam is used to create a molten pool on a substrate and metal powder is supplied to a point outside of the area at which the beam impinges upon the substrate. Movement of the substrate then carries the powder into the beam and molten pool, where it melts and mixes with the melted substrate material.

There is a need for methods of making wire in fewer processing steps and which can use simpler equipment which operates to provide movement along a single axis. There is also a need for methods of making wire which do not require extreme operating conditions, heavy equipment and large capital outlays. Methods and apparatuses are needed for making wire from more different types of materials than can easily be processes in the traditional manufacturing methods and apparatuses. There is also a need for ways of reducing or eliminating contaminants in wire products.

Therefore, it is an object of this invention to provide a single-step method of making wire.

It is another object of this invention to provide a method of making wire from a larger variety of materials than the metals and alloys from which wire is now made.

It is yet another object of this invention to provide a method of making wire which reduces or eliminates contamination of the wire articles.

It is a further object of this invention to provide a laser deposition process for making wire.

It is a still further object of this invention to provide a method of making wire with specific properties such as microstructural or magnetic orientation.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DISCLOSURE OF INVENTION

To achieve the foregoing and other objects, and in accordance with the purposes of the present invention, as embodied and broadly described herein, there has been invented a method of making wire from materials in particulate form comprising:

(a) defining the shape and dimensions of the wire;

(b) creating control commands effective to form the wire by deposition of molten material along a deposition path in a single axis;

(c) focusing a laser beam at a location within a deposition zone;

(d) providing particulate material to the deposition zone;

(e) forming a pool of molten material in the deposition zone by melting a portion of an article support and the particulate material by means of energy provided by the laser beam;

(f) depositing molten material from the deposition zone on the article support at points along a first portion of the deposition path by moving the deposition zone along the deposition path in order to form a solid portion of the wire which is adjacent to the article support;

(g) forming a pool of molten material in the deposition zone by melting a portion of the partially formed portion of wire and the particulate material by means of energy provided by the laser beam;

(h) depositing molten material from the deposition zone at points along a second portion of the deposition path by moving the deposition zone along the deposition path where the molten material solidifies after leaving the deposition zone, in order to continue formation of the wire; and (i) controlling flow of particulate material into the deposition zone, energy density of the laser beam, and focal position of laser beam by means of the control commands as deposition takes place.

Alternatively, instead of withdrawing the laser deposition zone along the deposition path on the axis of the laser beam, as in steps (f) and (h), the deposition zone can be focused and held in constant position with the wire being withdrawn from the deposition zone as the wire is formed.

Provisions can be made for recycling any unused particulate material in the process.

In another embodiment, an apparatus for carrying out the process of this invention is provided. The inventive apparatus comprises:

(a) a means for defining the shape and dimensions of a wire, this means being capable of creating control commands effective to form a wire by depositions of molten material;

(b) a feed mechanism for introducing particulate material into a deposition zone;

(c) a laser positioned to focus a laser beam into the particulate material in the deposition zone;

(d) supporting and drawing device for moving the wire away from the deposition zone; and (e) a controller for controlling flow of the particulate material, energy density of the laser beam, focal position of laser beam, and speed of withdrawal of the wire being formed from the deposition zone by using the control commands.

Alternatively, instead of having a supporting and drawing device to move the wire from the deposition zone, there is provided a device for moving the deposition zone along the axis of the laser beam away from the wire being formed.

Provisions can be made for recycling any unused particulate material in the apparatus.

BRIEF DESCRIPTION OF THE DRAWINGS

The accompanying drawings, which are incorporated in and form a part of the specification, illustrate some of the embodiments of the present invention and, together with the description, serve to explain the principles of the invention. In the drawings:

FIGS. 7a and 7b are, respectively, flow charts of conventional wire manufacture and of the invention method of wire manufacture, for purposes of comparison.

BEST MODES FOR CARRYING OUT THE INVENTION

Figure 1:
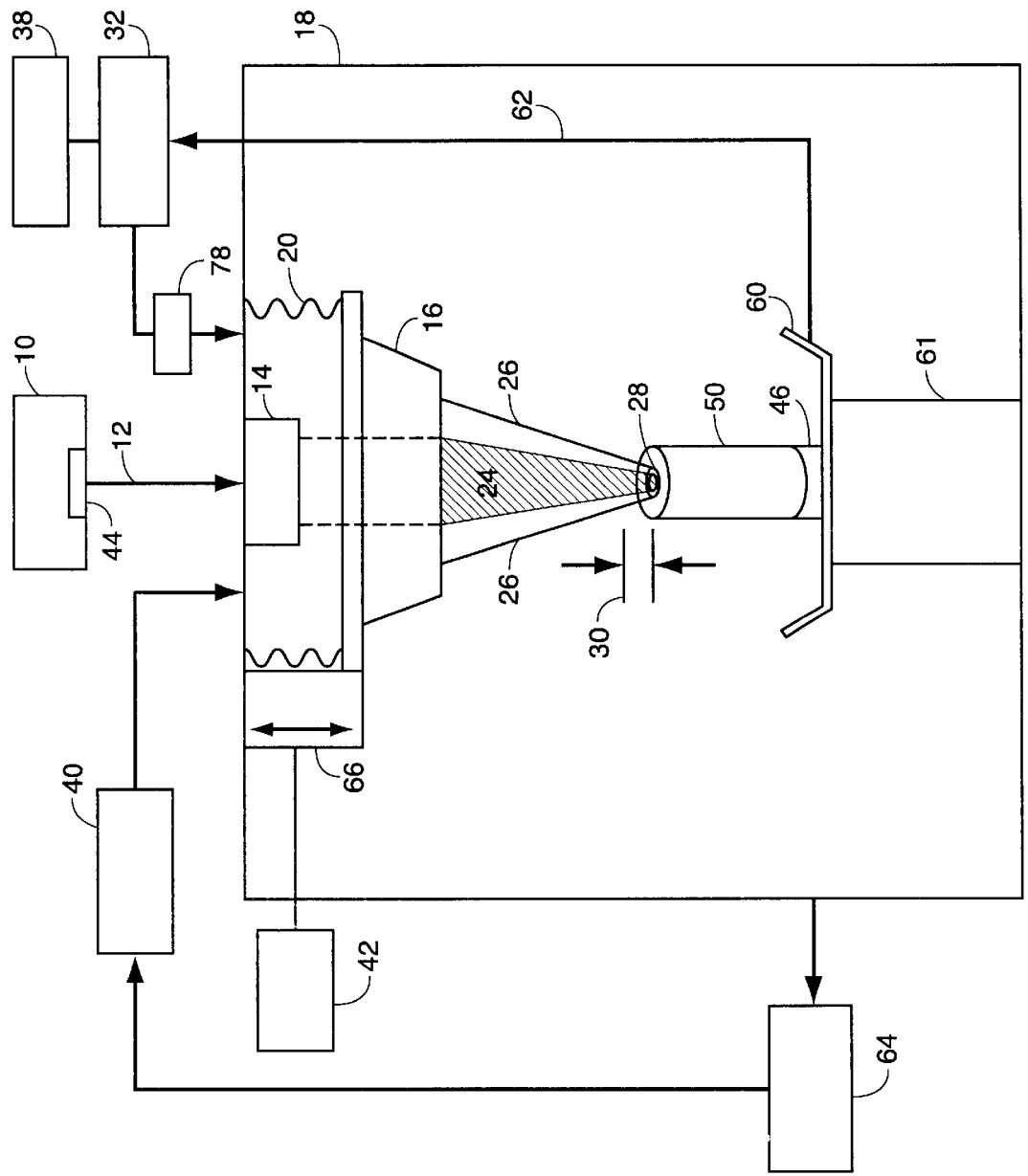
FIG. 1 is a schematic representation of wire formation in accordance with the present invention wherein free standing wire of any diameter can be formed by the relative motion along the laser beam axis of a laser deposition zone and the wire being formed.

It has been discovered that elongated articles in the form of wire can be produced by additive deposition of particulate material along a single axis.

In accordance with the present invention, wire is constructed by melting and depositing the particulate material into a laser energized deposition zone which has been designed to yield the desired wire shape and dimensions. The wire is withdrawn along a single axis from the deposition zone as it is formed, thus enabling formation of the wire in a continuous process. Alternatively, the deposition zone is withdrawn along a single axis from the wire as it is formed.

The process of this invention can be carried out using laser light as the means for melting the particulate material. Suitable pulsed or continuous wave lasers include those which produce sufficient energy to melt the materials from which it is desired to form wire. Suitable optics to achieve focus and energy densities to concentrate the energy required for melting of the selected materials are needed.

The relative motion of the laser beam with respect to the deposit is controlled by computerized numerical control (CNC) machine commands or an electromechanical device to directly deposit particulate material to form an accurately configured, fully dense metal wire. No drawing dies or extrusion dies are required, only the precise control of relative motion of laser and wire being formed, and control of the laser power, focal zone size, velocity and feed rate of particulate material in relation to the deposit required to form the wire. Once begun, the invention method can continuously process material without stopping, including the spooling of the wire.

An article support or substrate, generally a stub of wire or rod or other article having compatible geometry, made of a metallurgically compatible material, is mounted in a means for withdrawing the formed wire from the deposition zone. The article support is positioned so that the laser light strikes a trailing end of the article support as the first of the particulate material is deposited upon the trailing end of the article support as it melts.

The substrate or article support upon which the particulate material is deposited may be crystallographically oriented such as when a single crystal is used for the article support. When a single oriented crystal is used as a support for the invention method of making wire, in combination with the unidirectional heat flow produced by the process, an epitaxial grain growth of a preferred orientation in the wire being produced can be accomplished. This embodiment of the invention can be used to make a solidified (fully dense) wire product with unique metallographic properties.

Wires having magnetic properties can also be made using the invention method. Magnetized material is used for the substrate or article support upon which the particulate material is deposited to impart magnetic properties to the wire. Alternatively, the deposition zone can be exposed to a magnetic field produced independently of the article support. Exposure of the deposition zone to a magnetic field can be used to impart magnetic properties to the wire.

To start fabrication of a wire, a small portion of the article support is melted by the laser beam to form a molten pool. If the molten zone is too large or too small, the stability and integrity of the process decreases. Therefore, the processing variables (such as powder flow, delivery gas flow, laser power, laser focus, and relative motion) must be precisely controlled and are very important in producing wires having uniform dimensions and composition.

At least one stream of solid particulate material, or powder, is supplied to the point where the laser light is focused. This is generally done by means of gravity, mechanical feed mechanism, an assist gas with an eductor, or a combination of any of these feed mechanisms. A key feature of the powder delivery feed mechanism is that rather than merely delivering particulate material to the focal zone of the laser, the powder delivery feed mechanism can deliver at least one focused stream of particulate material co-focally to the laser focal zone. Two or more powder paths can be utilized. For example, multiple powder paths can be arranged in pairs with the first path of a pair oriented about 180 degrees from a second path of the pair. Multiple powder paths are useful for producing special alloy wires or wires with unique configurations or characteristics.

The particulate material is melted by heat generated when the laser light strikes the particles and by transfer of heat from the molten pool to the particulate material as the particulate material comes into contact with the molten pool.

After a small amount of material has been melted, the molten pool volume increases and begins to be enlarged by the introduction of more particulate material and laser energy. The molten material solidifies into wire at a solid-liquid boundary defined by the heat flow away from the molten pool by radiative, convective, and conductive heat loss, the laser power density, the velocity, and the particulate material feed rate. A continuous solid microstructure is obtained by maintaining a continuous solidification front when using a continuous wave laser or by remelting a portion of the previously deposited material and solidification when using a pulsed laser.

The space containing and surrounding the molten pool, the laser focal spot size, the focal point of the stream of particulate material, the focal point location of the laser beam, and that portion of the laser beam where energy density is great enough to melt the particulate material is termed the deposition zone. The deposition zone is defined by the energy boundaries of the laser focal zone which are sufficient to maintain a molten pool.

As molten particulate material is deposited .and cooled, a portion of the cooled, solidified particulate material can be re-melted by the impinging laser light and is mingled with the molten particulate material being newly formed. The method of this invention relies in part on precise focus of the stream of particulate material directly into the laser beam and molten pool which provides for both preheating of the particulate material by the beam and melting of the particulate material by entry of the particulate material into the molten pool. Uniform deposition can best be achieved by having the laser energy and powder in co-focal positions.

The deposition rates can be precisely controlled to achieve cooling rates ranging from 10 K/sec to more than $10^5$ K/sec. This broad range of deposition rates enables a wide range of deposit geometry and microstructures.

The motion command sequence of control commands or an electromechanical device moves the focal zone of the laser systematically relative to the length of the wire to fuse metal powder particles that are delivered to the focal zone into solid metal and form the wire continuously.

Alternatively, the laser and powder deposition devices can be held in constant position while the formed wire is withdrawn from the deposition zone as deposits consisting of the particulate material are consolidated by melting and subsequently solidified due to loss of heat to the surroundings.

The focal point of the laser light can be sized and moved along a path in accordance with computerized numerical control software. As an example, the focal point of the laser can be programmed to produce larger or smaller diameters or round, oval, or other cross-sectional shapes of wire for continuous indefinite lengths.

The processes of this invention do not rely on a three-dimensional solid computer based model. A much simpler electromechanical device can be used to directly move the wire being formed or the deposition zone in a single axis or a much simpler computer model can be used to accomplish movement of the wire being produced relative to the deposition zone in a single axis.

When control commands are used in a computer numeric controlled apparatus, control commands are needed to: (a) ramp up the laser power; (b) turn on the flow of particulate material; (c) turn on the gas flow; (d) move the deposition head to the location where deposition is to begin; (e) open the laser shutter; (f) dwell in the deposition location for a time sufficient to create a molten pool and begin deposition; (g) move the laser head relative to the molten pool while continuing deposition; (h) close the laser shutter; (i) move the deposition head away from wire being formed for, alternatively, move the wire being formed away from the deposition zone; (j) turn the flow of particulate material off; (k) turn the gas flow off; and, finally, (l) ramp down the laser power.

The methods of this invention provide for the fabrication of wire with a high directionally oriented microstructure due to the potential for microstructural growth under near uni-direction heat flow and solidification conditions.

The invention method can be used to make discrete, single, short wires one at a time. Alternatively, the invention method can be used for producing continuous uninterrupted runs. For example, as deposited wire is formed continuously, it can be taken up onto spools positioned outside the processing chamber, without stopping or even slowing production between spools.

With reference to FIG. 1, in one embodiment of the invention, a beam from an Nd:YAG laser 10 is delivered by means of a fiber optic 12 through a laser window 14, into a containment chamber 18, to a sealed boot 20 that holds a laser focusing head 22.

The focusing head 22 can be moved by any suitable device away from the wire as it is formed. For example, this can be a motor driven positioner 66 controlled by a contoller 42.

The device for withdrawing the focusing head 22 (and thereby the focal zone) away from the formed wire can also be contained within the sealed containment chamber 18.

Alternatively, the device for withdrawing the wire from a deposition zone can be outside the sealed chamber 18.

The focused laser beam 24 enters the containment chamber 18 through a quartz laser window 14 in a nozzle 16 that also delivers the particulate material to the focal zone 30.

The entire invention process takes place in an inert gas atmosphere in the sealed containment chamber 18 if that is made desirable by the properties of the material being processed. The sealed chamber atmosphere can be conditioned by a dry train 64 that reduces the oxygen content within the chamber to 5 ppm or less. Employment of a sealed chamber to control the atmosphere is useful when processing materials which would be reactive with oxygen or moisture in the air or when oxygen or moisture could become unintentionally incorporated into the product. Relatively unreactive gases such as nitrogen or argon can be used to replace ambient air in the containment chamber 18. However, when processing less reactive materials such as precious metals or some steels, the invention can be practiced without use of a sealed chamber.

In the upper right of the schematic of FIG. 1 is a powder mixing chamber 38. The powder mixing chamber 38 can be evacuated and backfilled with inert gas. The powder feeder 32 entrains the particulate material in an inert gas stream that delivers the particulate material to the laser focusing head 22 and then to the focal zone 30. Optionally a powder stream splitter 78 can be used to direct a plurality of powder streams into the deposition zone 28 from a plurality of directions. The inert gas stream can be recycled from the containment chamber 18 back into the delivery gas supply 40 or back into the delivery gas supply 40 by way of a gas purifier, treatment unit or recycler 64.

The positioning controller 42 which drives the focusing head 22 along a single axis also switches the laser shutter 44 and powder feeder 32 on and off, and controls various gas flows. Examples of commercially available positioning controllers which can be used include, but are not limited to, Anorad™ and Laserdyne™ controllers. Also, simpler controllers or more nearly completely mechanical means can be used since the wire can be produced using movement only along one axis.

Still with reference to FIG. 1, the deposition process is started by forming a molten pool on an article support 46 such as a short segment of wire or rod that can be cut off after deposition is complete. Typically the article support 46 is heated by the laser beam 24 without the powder feed turned on to preheat the article support 46, create melting, and promote better adhesion of the first fused particulate material volume. Particulate material is then formed into a conic particulate stream 26 and fed into the focal zone 30 and the wire is deposited continuously until the desired length of material is generated.

The particulate material melts and resolidifies as heat is removed by conduction through the base and by radiation from the deposition zone 28. Excess particulate material which does not reach the focal zone 30 of the laser beam accumulates at the base of the article support 46 and is collected by the powder collection recycler 60 for reuse. Alternatively, the particulate material can be recycled directly from the powder collection recycler 60 back to the powder mixing chamber 38 in a continuous loop process.

Deposited material forming into the wire may be passed through a seal or vent allowing sectioning and packaging outside the controlled deposition environment of the containment chamber 18.

In a second embodiment of the invention another new method of continuously processing wire is described. Unlike conventional continuous casting which relies on crucibles, rolls and molds to confine and shape the melt, the invention process can be used to manufacture wire in a single continuous step.

This continuous processing embodiment of the invention method can be a containerless process achieving melting and forming of wire without contacting other materials during formation of the wire. The wire is formed and cooled prior to spooling, cutting or packaging into lengths or spool sizes as desired.

Figure 2:
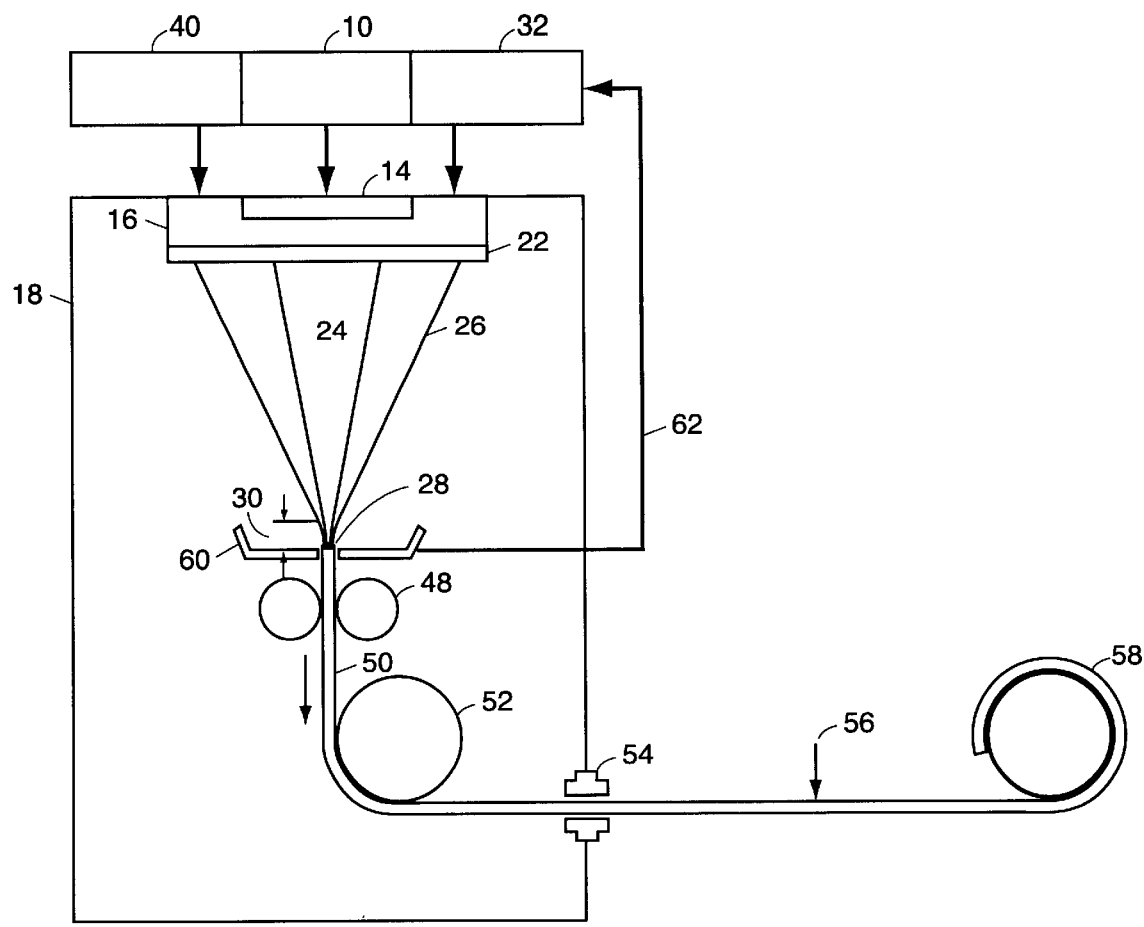
FIG. 2 is a schematic representation of continuous processing of material and wire formation in accordance with the present invention.

An example of simplified continuous processing method in accordance with the invention, shown in FIG. 2, uses a fixed laser beam 24 (without fiber optic delivery), a single axis of motion (z) without computerized numerical control, an inert but lower purity inert atmosphere containment chamber 18 and a feed through seal 54 for removal of formed wire.

With reference to FIG. 2, a laser 10 is positioned to focus through a laser window 14 into a laser focusing head 22 so as to project a laser beam 24 into a deposition zone 28. Simultaneously therewith, a relatively inert gas from a delivery gas supply 40 is used to direct particulate matter from a powder feeder 32 in a particulate stream 26 into the deposition zone 28. In the focal zone 30 in the deposition zone 28 the laser beam 24 melts the particulate matter and forms the elongated wire 50 in the same manner described with reference to the first embodiment of the invention. A device 48 for withdrawing wire is positioned below the deposition zone 28 so that the wire 50 is withdrawn from the deposition zone 28 as it is formed to produce the relative motion required between the laser focal zone 30 and deposition surface.

A redirecting roller 52 can be used to allow withdrawal of the formed wire at an angle to the formation direction. A feed through seal 54 allows the formed wire 50 to be pulled from within the containment chamber 18 onto a take-up spool 58. After the desired amount is wound onto the take-up spool 58, formed wire may be cut in a cut off location 56 allowed between the feed through seal 54 and the take-up spool 58 and the new end started onto a new take-up spool.

Any unused particulate matter is caught in a powder collection recycler 60 and recycled through a powder recycling loop 62 back into the powder feeder 32.

Another embodiment of the invention is a method of continuously producing wire having varying cross sections or of changing from one cross section or specific chemical composition to another without stopping the process to retool. For example, production of 0.045" wire can be seamlessly converted into production of 0.065" wire without stopping to change drawing dies or other equipment such as that required by conventional processing. This is accomplished by changing parameters which affect the deposition rate, such as laser power, motion speed and powder flow rate. The powder composition can be altered or changed by adding or refilling a new type or grade of powder to the powder feed supply.

For example, three powder compositions can be fed sequentially or simultaneously and combined with the laser energy and inert gas, and focused into a deposition zone to produce a deposit. This deposit can be varied from one specific chemical composition to another during continuous production of the wire by controlling the proportionate amount of each of the three powders going into the mixture.

Figure 3:
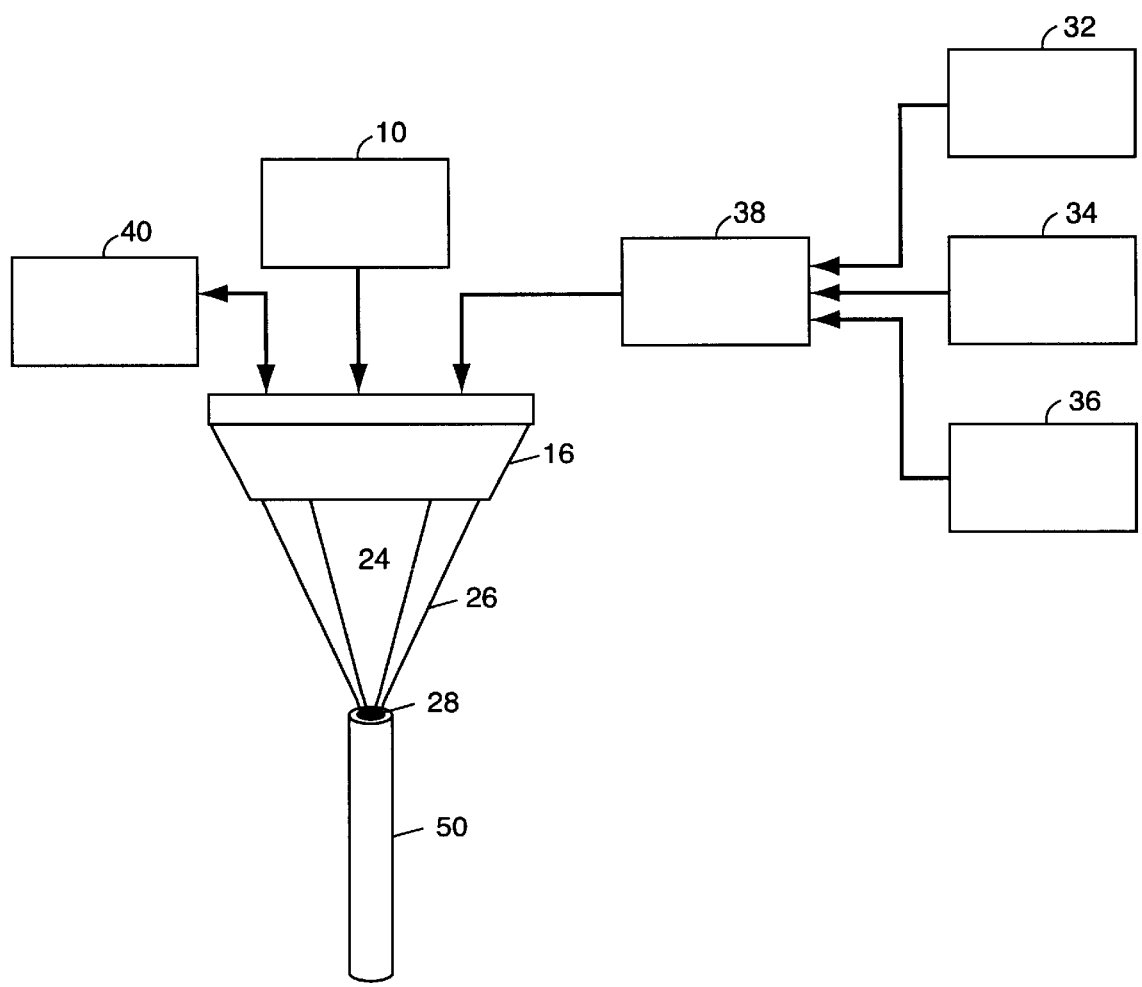
FIG. 3 is a schematic representation of a set up for making wire from a three-component particle mixture.

With reference to FIG. 3, three separate powder feeders 32, 34 and 36 are filled with the selected particulate materials and adjusted to release the desired proportionate amounts by adjusting the rate of screw feeders and adjusting the delivery gas pressure for each of the three separate powder feeders. The three different feed materials from three separate powder feeders 32, 34 and 36 are combined in a common powder mixing chamber 38. Relatively inert delivery gas from a delivery gas source 40 is used to carry the powder from an eductor which is fed by the common powder mixing chamber 38 to the delivery nozzle 16 in the form of a mix of powder and inert gas.

The inert delivery gas also serves to protect the molten pool and shields the deposition zone 28 from oxygen or contamination by other unwanted materials. The deposit is also cooled by the inert delivery gas.

Figure 4:
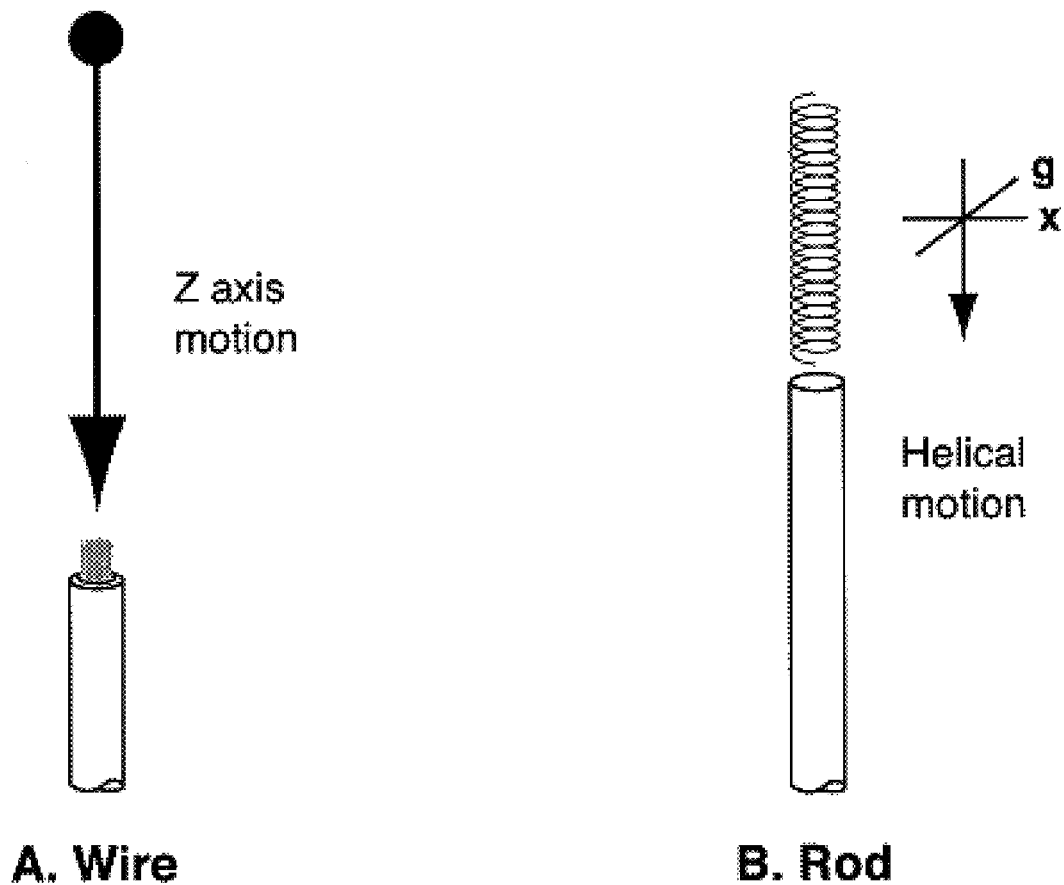
FIGS. 4a and 4b show a comparison of a simple, direct invention deposition path with a more complicated deposition path which requires use of a three-dimensional computer model.

FIGS. 4a and 4b show a comparison of a simple, direct invention deposition path with a deposition path in accordance with the method disclosed and claimed in U.S. Pat. No. 5,837,960. In FIG. 4a the deposition path along a single axis co-incident with the laser beam is used to form a wire in accordance with the present invention. In 4b, a more complex movement of the deposition path along three axes is necessary to form the wire using a three-dimensional computer model.

Inert gas purity suitable for use in the present invention is generally in the range from less than 1 ppm to greater than 200 ppm oxygen and water, depending upon purity and properties of product desired for the intended end use. Materials less reactive to oxygen or nitrogen can be formed in atmospheres containing higher concentrations of oxygen and water. The degree to which oxygen and water must be excluded depends upon the grade or quality of product desired. For example, for making an A or B grade product, gas purity ranging from about 50 to about 150 ppm generally can be used. Presently preferred for making wire from high strength, hard or refractory alloys such as nickel-, cobalt- and tungsten-based alloys is gas purity in the range from about 5 ppm to about 50 ppm oxygen and water.

Materials which can be used for the processes of this invention include both easily processed materials and materials which would be difficult or impossible to process using traditional or other non-conventional methods. Easily processed materials which can be used in the practice of this invention include ferrous and nonferrous metals such as steel aluminum, copper, silver, and gold and mixtures thereof. For example, stainless steel can be processed into wires which have high strength, ductility, corrosion resistance and wear resistance.

Table I shows processing parameters which can be used to produce type 316 stainless steel wire using this invention.

TABLE 1

Process Parameters and Resultant Wire Diameter
Type 316 Stainless Steel

| Run | Laser Power, Watts | Velocity, mm/sec | Powder Feed Rate, gm/min | Diameter, mm |
|---|---|---|---|---|
| 1 | 57 | 2.1 | 5.6 | 1.19 |
| 2 | 102 | 1.3 | 5.6 | 1.90 |
| 3 | 102 | 1.7 | 8.3 | 1.78 |
| 4 | 102 | 1.7 | 12.0 | 1.72 |
| 5 | 117 | 1.7 | 12.0 | 1.85 |
| 6 | 135 | 1.7 | 12.0 | 2.03 |
| 7 | 160 | 1.7 | 12.0 | 2.26 |

The inventive method and apparatus can be used to process precious metals such as gold, silver, iridium, paladium, platinum, and alloys and mixtures thereof.

Examples of materials that are generally difficult to process using previously known methods include refractory metals such as tungsten, molybdenum, niobium, vanadium, rhenium, and tantalum; reactive metals such as titanium, zirconium and hafnium; and toxic or hazardous materials such as beryllium, cobalt and nickel; and alloys or mixtures thereof.

Blended or mixed powders may be fused into alloys or composite mixtures to form materials not commercially available in any form, or to make otherwise available materials more economically or with improved properties.

Two examples of useful intermetallic compounds which can be used in the present invention are nickel aluminide (NiAl) and molybdenum disilicide ($MoSi_2$), neither of which is yet available commercially in wire or rod form.

Figure 5A:
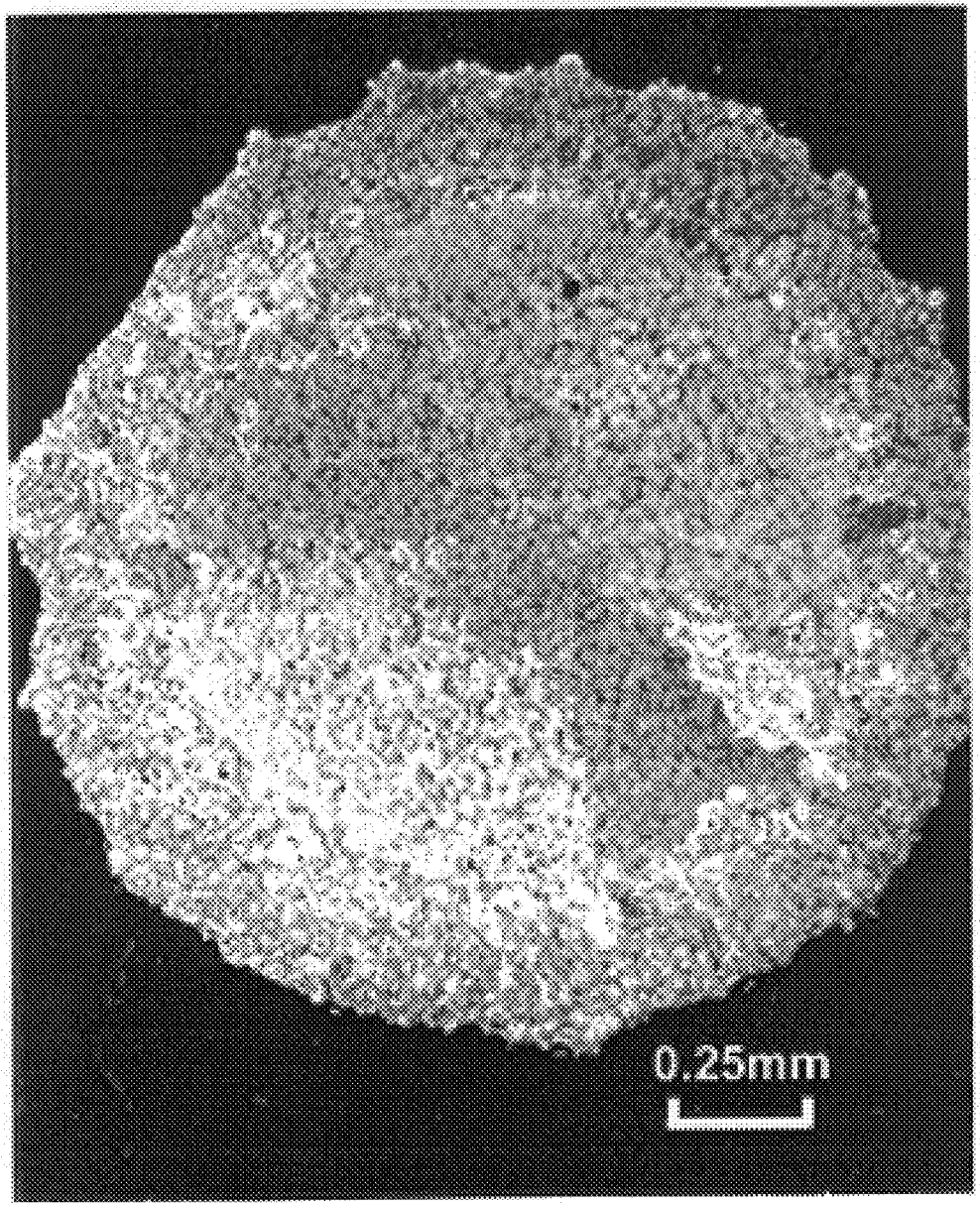
FIGS. 5a and 5b show a metallographic cross section and longitudinal section of a fully dense titanium aluminum alloy wire made in accordance with the present invention.
Figure 5B:
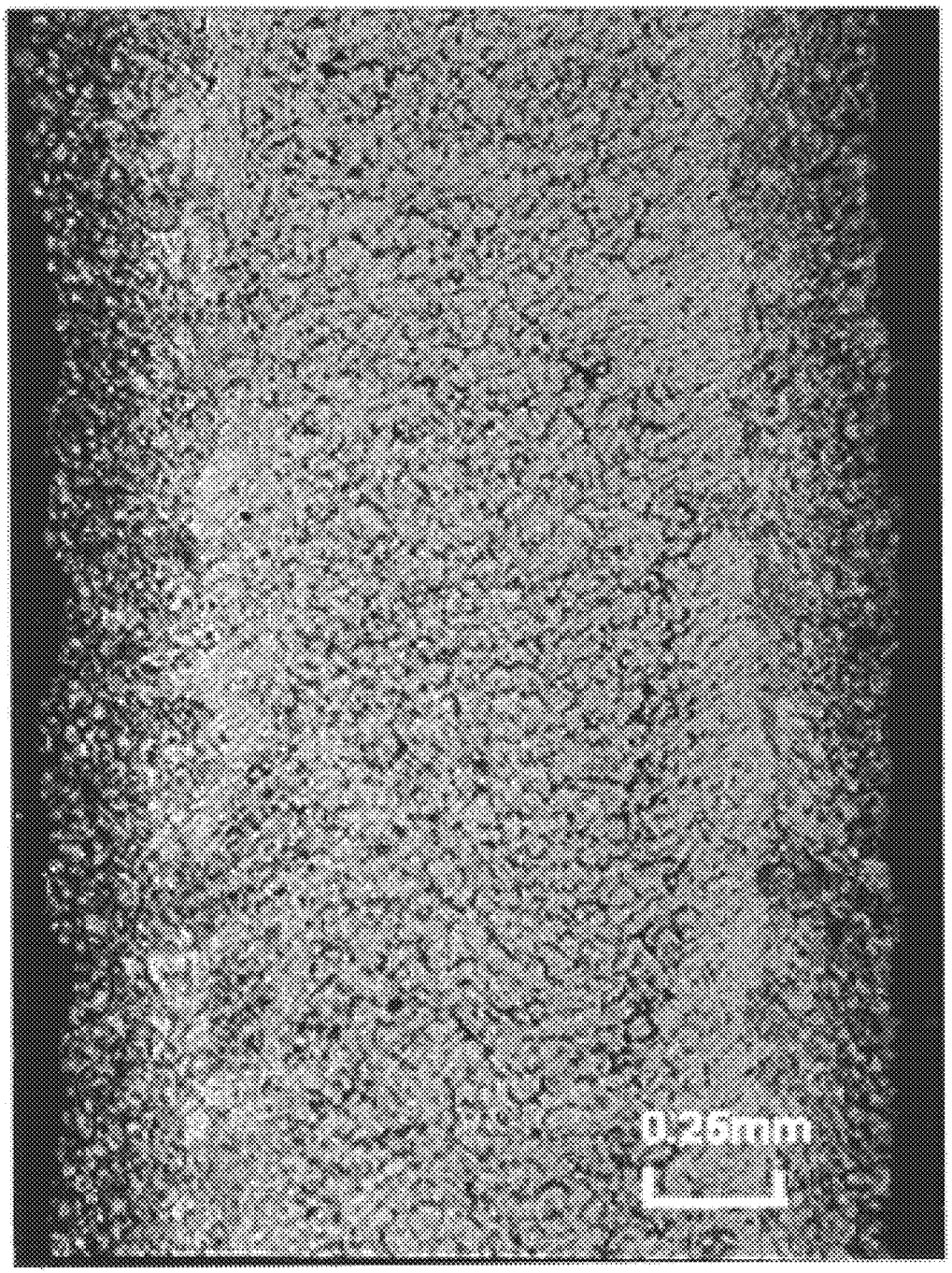

FIGS. 5a and 5b show, respectively, a metallographic cross section and a longitudinal section of a titanium aluminum alloy large diameter wire made in accordance with the invention methods.

A number of alloys and composite mixtures of materials which display specific characteristics which may complicate or make difficult processing in previously known methods can be processed easily using the present invention. Examples of materials which can be processed into wire using the present invention include alloys and mixtures having abrasion, corrosion, wear or high temperature resistance, high impact strength, brittleness or hardness, such as cobalt based alloys and composite materials that contain hard fibers or particles such as tungsten carbide.

Figure 6:
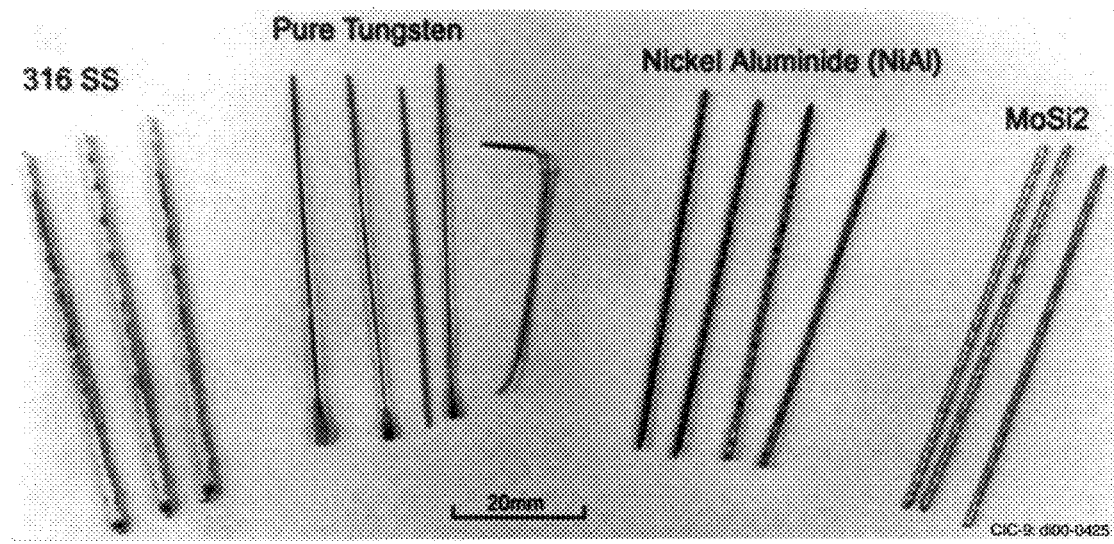
FIG. 6 shows thin wire segments made from 316 stainless steel, tungsten, nickel aluminide and molybdenum disilicide in accordance with the present invention.

Materials for the production of wire in accordance with the present invention can be chosen for the desired economics, facility of processing and desired properties. For example, FIG. 6 shows wire segments of 316 stainless steel, pure tungsten, nickel aluminide and molybdenum disilicide made in accordance with the invention process. Although nickel aluminide and molybdenum disilicide are generally brittle, and pure tungsten rods can be bent only once or twice, wires made of stainless steel can be repeatedly bent, thus displaying ductility and properties needed for spooling.

Particulate material suitable for use in this invention can be made by remelting cast ingots and atomizing the molten metal by injecting gas, water, mechanically spinning the liquid, or pouring the liquid onto a high speed spinning plate. The chemically segregated ingot is randomized by this process of making particulate material by atomization of re-melted cast ingots because the small powder particles are distributed randomly, collected and reconsolidated during formation of the elongated articles in accordance with the process of this invention.

Particulate material generally most suitable for use in this invention is usually in larger particle sizes than particulate materials considered to be hazardous or carcinogenic due to suspension of the particles in air. These larger particle sizes as well as a spherical shape are desirable due to the flow characteristics, though the use of smaller and/or irregular shaped particles has been demonstrated using the present invention. In many cases, such as processing of refractory metals, powder is the fundamental form of the metal as a result of the extraction methods used to produce the metal. In other cases, powder already readily available commercially for powder metallurgy or thermal spraying processes is used in the invention process.

Particle sizes which can be used in the practice of this invention are generally in the range from about 1 micron to about 250 microns. Presently preferred are particle sizes in the range from about 5 microns to about 150 microns. Presently most preferred are particle sizes in the range from about 50 microns to about 100 microns, depending upon such variables as powder morphology (spherical, angular, irregular), material density, packing density and powder flow characteristics.

The raw material which does not become part of the wire is easily collected and reused without any additional processing or reprocessing. In most embodiments of the invention, particulate material which is not fused into the product may be used again by recycling into the feed stock. The economic benefit of recycling unfused, uncontaminated material makes the invention method attractive for processing of rare or expensive materials and makes the process essentially waste free.

Conventional casting methods are limited to casting rods of many millimeters in diameter. When wires or small diameter rods are required, the cast rods are then ground to as small as 0.5 mm or less. The expensive grinding process creates large amounts of waste and is a very costly way of producing wire. The invention method produces materials as good or better than those produced by the conventional methods in a single step without waste.

With use of this invention it is possible to manufacture wires and small diameter rods having greater purity than the purity of the powder used for deposition because the heat and melting occurring in the deposition zone can form gases of impurities which are then driven off. For example, grade B powder can be refined during forming to produce grade A wire.

In conventional methods contaminants such as drawing lubricants or carbon pickup from drawing or swaging dies can cause defects and limitations in subsequent use of the contaminated wires. However, materials with properties which are made less desirable by picking up of contaminants during conventional processing methods can be used in the practice of the present invention. An example of such materials are the cobalt-based filler materials used for the re-conditioning of turbine blades. Pickup of lubricants and carbon during conventional processing render these alloys useless for this type of repair and require very slow and/or expensive alternative processing methods such as quartz casting.

The benefits of powder metallurgy techniques for the production of commercial wires are also improved upon by the invention process by virtue of the reduction in tooling and processing steps as well as superior quality of the resultant material deposit of the present invention. Flow charts comparing the steps of the invention method with the steps of conventional wire manufacture are shown in FIGS. 7a and 7b. It can be seen that the invention significantly reduces the manufacturing steps.

The ability to directly form wire by the process of this invention offers the advantage of structural integrity gained by achieving full mechanical strength in the metal deposit. The process and apparatus of this invention enables the manufacture of highly homogenous, pure forms of commercially useable wire in a manner which has improved cost effectiveness, speed, quality and ranges of materials which may be processed.

Fully dense metal wires having uniform surface texture, composition and diameter can be made by deposition along a single vertical axis parallel to the axis of the laser beam.

Wire made by the laser deposition process of this invention is relatively free of internal stresses in comparison to wire or rod made by traditional methods because the continuous solid/liquid interface region produced in the invention process yields fully dense components. This contrasts to other near net shape liquid powder techniques (e.g., thermal spraying) in that a molten droplet does not impact onto a solid substrate, and as a result, structural integrity degradations attributed to splat gaps and other pore defects are absent.

Figure 8A:
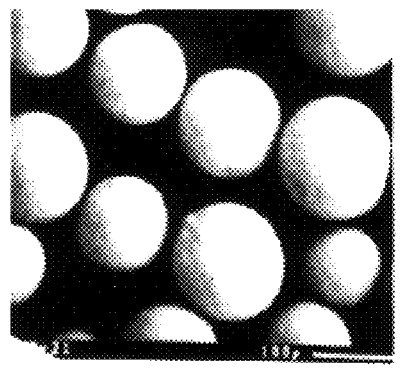
FIGS. 8a, 8b and 8c show the powder used, microstructure as shown in a micrograph of a polished cross section and fracture surface, respectively, of wire made in accordance with the invention from 316 stainless steel.
Figure 8B:
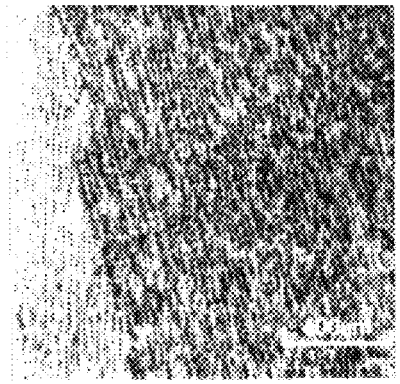
Figure 8C:
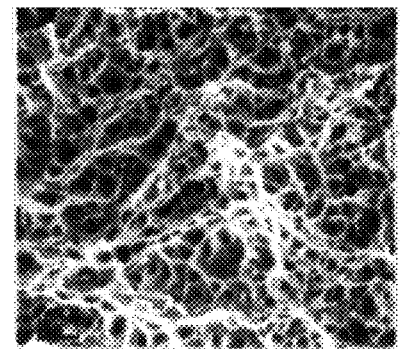

Wire made in accordance with this invention has annealed properties, that is, its microstructure and metallurgical properties are similar to those of articles which have been annealed. FIGS. 8a, 8b, and 8c, show the powder used, microstructure as shown in a micrograph of a polished cross section and fracture surface of a wire made in accordance with the invention from 316 stainless steel.

Figure 9A:
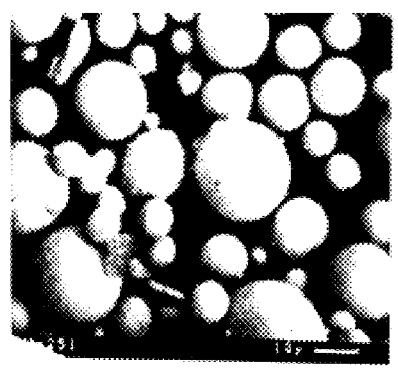
FIGS. 9a, 9b and 9c show the powder used, microstructure as shown in a micrograph of a polished cross section, and fracture surface, respectively, of wire made in accordance with the invention from tungsten.
Figure 9B:
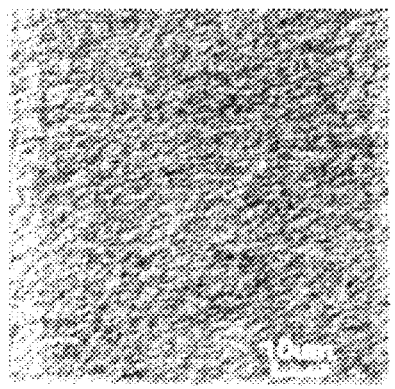
Figure 9C:
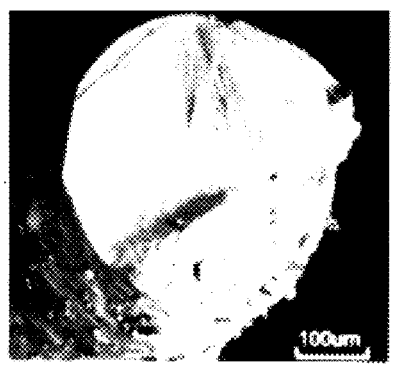

FIGS. 9a, 9b, and 9c, show the powder used, microstructure as shown in a micrograph of a polished cross section and fracture surface of a wire made in accordance with the invention from tungsten.

Figure 10A:
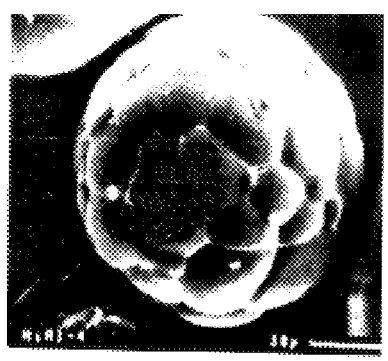
FIGS. 10a, 10b and 10c show the powder used, microstructure as shown in a micrograph of a polished cross section, and fracture surface, respectively, of wire made in accordance with the invention from nickel aluminide.
Figure 10B:
Figure 10C:
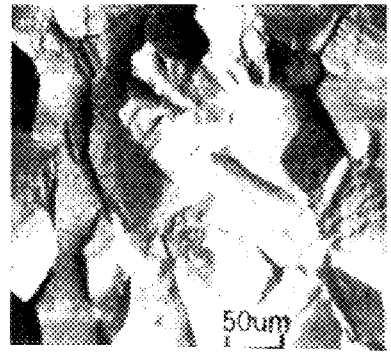

FIGS. 10a, 10b, and 10c, show the powder used, microstructure as shown in a micrograph of a polished cross section and fracture surface of a wire made in accordance with the invention from nickel aluminide.

Figure 11A:
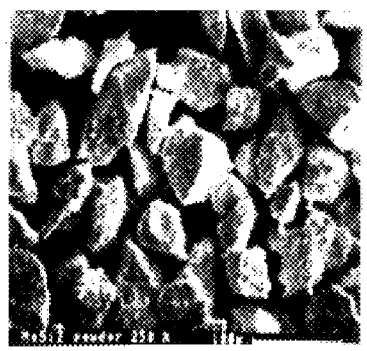
FIGS. 11a, 11b and 11c show the powder used, microstructure as shown in a micrograph of a polished cross section, and fracture surface, respectively, of wire made in accordance with the invention from molybdenum disicilide.
Figure 11B:
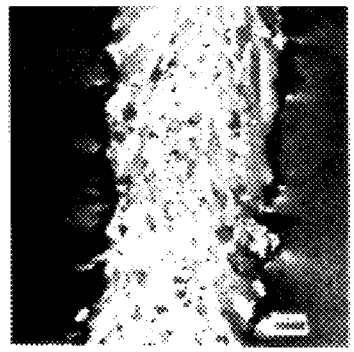
Figure 11C:
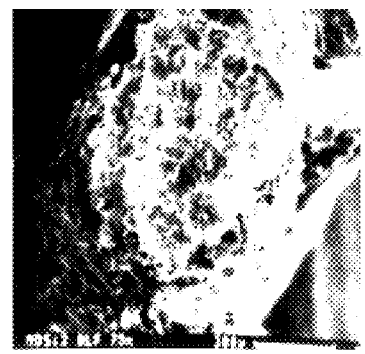

FIGS. 11a, 11b, and 11c, show the powder used, microstructure as shown in a micrograph of a polished cross section and fracture surface of a wire made in accordance with the invention from molybdenum disilicide.

If the material of the wire made from the invention process is heat-treatable, the properties of the wire, such as strength, ductility, fracture toughness, and corrosion resistance, can be modified by means of heat treatment.

Surface melting of partially fused powder particles can be achieved by directing a portion of the laser beam to remelt the surface after the initial deposition process to create a smoother surface if desired.

There is no need to dispose of excess lubricants used in drawing wire and no need to clean lubricants from drawn wire made by the processes of this invention because use of lubricants is unnecessary. The waste stream resulting from the invention process is virtually eliminated. No contamination is left on the surface of the wire, so subsequent steps generally used to remove contamination such as solvent cleaning or grinding are not required. However, grinding, rolling, swaging or other forming operations may be employed as secondary operations to impart further characteristics to the deposited materials if desired.

The following examples will demonstrate the operability of the invention.

EXAMPLE I

A set of runs was made using the invention process to make fifty titanium/aluminum alloy wires in a range of diameters from 0.050" to 0.150".

Equipment was set up as diagrammed in FIG. 1 and described in the specification hereof.

A Lumonics™ two-kilowatt continuous wave Nd:YAG laser, commercially available from Lumonics in Livonia, Mich. was used to generate the 1.06 micron wave length laser energy. The laser beam was focused co-axially with a stream of −180 to +325 mesh particle size spherical powder commercially available from Crucible Research in Oakdale, Pa.

The laser beam melted the powder and provided a focused laser spot, accurate enough to form small wires.

Deposition of the parts was achieved by using 122 watt laser power, 4 to 16 inches per minute travel speed, a powder feed of 7 to 15 grams per minute, and 3.44 standard liters per minute of argon gas. Atmosphere purity in the containment chamber was maintained at 50 ppm oxygen and water.

Although a much simpler controller could have been used, a 5-axis Laserdyne™ 94 directed light fabrication system controller (commercially available from Laserdyne in Eden Prarie, Minn.) was used to articulate the laser head with respect to the deposited material so that continuous fusion and build up of material was achieved.

The controller used an Intel 486 PC type computer to control the 5-axis drive control boards and the control laser by means of an RS-232 serial port. It had a graphical user interface to allow setup and execution of the machine and motion control program.

Machine commands were edited directly into the console of the motion controller and laser controller interface to start the flow of powder and laser energy and to begin the motion.

A vertical single-axis deposition path was programmed directly into the Laserdyne 94 controller. Other system parameters were: 4 to 16 inches per minute motion, 5 to 50 ppm oxygen and water content of the atmosphere in the containment chamber, 3.44 standard liters per minute argon gas delivery, and 7 to 15 grams per minute powder flow.

The powder was fed by a screw-type feed to an eductor where argon delivery gas was used to take the powder to a splitter which divided the powder into 8 streams in tubes connected to a nozzle at the laser head.

At the laser head the 8 multiple streams of powder were delivered so as to achieve a precise focus of the powder streams at a position cofocal to the laser beam.

The powder was 48% titanium, 48% aluminum, 2% niobium and 2% chromium.

The wires were grown vertically using a single axis of motion (without use of the spiral tool path) at 122 watts at a linear speed of 4 to 16 inches per minute.

Using the single axis deposition path program, a uniform density, a 0.125" diameter titanium/aluminum wire was also formed. Although this very hard material would be extremely difficult to process by existing conventional methods, the titanium/aluminum wire was relatively easy to form using the invention process.

The 13" long wires were observed to have a uniform cross sectional area and a surface of partially fused powder. Some wires were centerless ground to demonstrate that the wires could be reduced in size to wires having cross sectional diameters as small as 0.028".

Metallographic sectioning and microscopic inspection was used to determine full density.

The wire samples produced were cut from the starting support steel plate using a metal saw and sliced into ¾" tall half sections. The sections of nickel alloy wire were mounted in 1" diameter standard metallographic mounts using epoxy. The cut surfaces of the wires were then polished and etched, to reveal the microstructures of the wires. The microstructures of the wires were examined at magnifications ranging from 10× to 600×. The examination showed that the wires produced were fully dense as shown in the cross section of FIG. 5a.

The microstructural development in the samples processed in accordance with this invention typically displayed continuous morphologies as well as refined segregation features, indicating a constant solid/liquid interface and rapid solidification kinetics. No discoloration of the surface was observed; lack of coloration indicated a pure, uncontaminated, as deposited surface.

Epitaxial grain growth was observed along the length of the wire by microscopic inspection at a magnification of 400×.

The samples produced in this example were also tested using a scanning electron microscope electron dispersive spectroscopy system to determine the chemistry of the samples. This test showed that the samples had the same proportionate amounts of materials as were introduced into the process in powder form. Therefore, there had been no preferential vaporization of the starting materials during processing. This demonstrated that the chemical composition of the starting material was not affected by this method of processing.

FIGS. 5a and 5b show, respectively, a cross section and longitudinal section of the wire formed in this example.

EXAMPLE II

In this example, a single axis of motion was used to fuse pure tungsten into large diameter wire. Equipment was set up as depicted in FIG. 1, in the manner described in Example I.

A pulsed Nd:YAG laser (Lumonics™ 701) was used along with an Anorad™ II motion controller to achieve semi-automatic process control. Commands were entered manually into the laser and motion system as well as manual operation of the gas and powder flow control.

The atmosphere purity used for this example was 5 ppm oxygen and water.

The support structure used to begin wire deposition was a metal plate from which wires were cut off after growth.

Wires were grown using 100 watts of power at a speed of 5 inches per minute and a powder feed rate of 5 grams/minute. Spherical tungsten powder was used in a size range from 5 microns to 50 microns.

The samples produced in this example were subjected to simple bending of greater than 90° to demonstrate the ductility of the soft annealed microstructure of the tungsten deposit. After 1 to 2 bends, the wires broke. The fracture surfaces were examined with a scanning electron microscope at 1500× magnification. No voids or discontinuities were observed.

The ductility demonstrated by the number of bends possible before breaking of the invention sample wires was clearly superior to that of similar pure tungsten welding rods of the same dimensions made by conventional methods, because the conventional tungsten welding wires could not be bent at all without breaking.

The tungsten wire samples produced in this example were metallographically tested for full density in the manner described in Example I. The tungsten deposited in accordance with the invention as described in this example was determined to be fully dense by metallographic cross sectioning.

While the apparatuses, articles of manufacture, methods and compositions of this invention have been described in detail for the purpose of illustration, the inventive apparatuses, articles of manufacture, methods and compositions are not to be construed as limited thereby. The claims are intended to cover all changes and modifications within the spirit and scope thereof.

INDUSTRIAL APPLICABILITY

The invention is useful for making a large variety of wire or other elongated shapes from a variety of materials including materials not commercially available, precious metals, or other specialty materials. Articles made in accordance with the invention can be used for such diverse applications as filler wires for repair of aircraft, aerospace and marine components, precision hard facing, refractory components for space applications, heating elements, filaments, emitters, high temperature furnace hardware, and wherever wires or rods with specialty components or unusual cross sections are needed.

What is claimed is:

1. A method of forming a wire from materials in particulate form, said method comprising:

(a) defining the shape and dimensions of a wire;

(b) creating control commands effective to form said wire by deposition of molten material along a deposition path in a single axis;

(c) focusing a laser beam at a location within a deposition zone;

(d) providing particulate material to said deposition zone;

(e) forming a pool of molten material in said deposition zone by melting a portion of an article support and said particulate material by means of energy provided by said laser beam;

(f) depositing molten material from said deposition zone on said article support at points along a first portion of said deposition path by moving said deposition zone along said deposition path, where said molten material solidifies after leaving said deposition zone, in order to form a portion of said wire which is adjacent to said article support;

(g) forming a pool of molten material in said deposition zone by melting a portion of said partially formed wire and said particulate material by means of energy provided by said laser beam;

(h) depositing molten material from said deposition zone at points along a second portion of said deposition path by moving said deposition zone along said deposition path, where said molten material solidifies after leaving said deposition zone, in order to continue formation of said wire; and (i) controlling flow of particulate material into said deposition zone, energy density of said laser beam, speed of withdrawal of said deposition zone from wire being formed, and focal position of said laser beam by means of said control commands as deposition takes place.

2. A method of forming a wire from materials in particulate form, said method comprising:

(a) defining the shape and dimensions of a wire;

(b) creating control commands effective to form said wire by deposition of molten material along a deposition path in a single axis;

(c) focusing a laser beam at a location within said deposition zone;

(d) providing particulate material to said deposition zone;

(e) forming a pool of molten material in said deposition zone by melting a portion of an article support and said particulate material by means of energy provided by said laser beam;

(f) depositing molten material from said deposition zone on said article support at points along a first portion of said deposition path by moving said article support away from said deposition zone as said molten material solidifies after leaving said deposition zone, in order to form a portion of said wire which is adjacent to said article support;

(g) forming a pool of molten material in said deposition zone by melting a portion of said partially formed wire and said particulate material by means of energy provided by said laser beam;

(h) depositing molten material from said deposition zone at points along a second portion of said deposition path by moving said partially formed wire away from said deposition zone in accordance with said deposition path as said molten material solidifies after leaving said deposition zone, in order to continue formation of said wire; and (i) controlling flow of particulate material into said deposition zone, and energy density of said laser beam, focal position of said laser beam, and speed of withdrawal of said wire being formed from said deposition zone by means of said control commands as deposition takes place.

3. A method as recited in claim 1 wherein said method is carried out in a controlled atmosphere.

4. A method as recited in claim 2 wherein said method is carried out in a controlled atmosphere.

5. A method as recited in claim 1 wherein said deposition zone is exposed to a magnetic field.

6. A method as recited in claim 2 wherein said deposition zone is exposed to a magnetic field.

7. A method as recited in claim 1 wherein any particulate material escaping unused from said deposition zone is recycled back to a particulate material supply for supplying said deposition zone.

8. A method as recited in claim 2 wherein any particulate material escaping unused from said deposition zone is recycled back to a particulate material supply for supplying said deposition zone.

9. A method as recited in claim 1 wherein shape and dimensions of a wire are defined by use of and within a digital computer.

10. A method as recited in claim 2 wherein shape and dimensions of a wire are defined by use of and within a digital computer.

11. A method as recited in claim 1 wherein said control commands are executed by apparatus under control of a digital computer containing a program specifying locations on the deposition path at which the control commands are to be executed.

12. A method as recited in claim 2 wherein said control commands are executed by apparatus under control of a digital computer containing a program specifying locations on the deposition path at which the control commands are to be executed.

13. A method as recited in claim 1 wherein said flow of particulate material into said deposition zone, energy density of said laser beam, and speed of movement of said deposition zone along said deposition path are controlled by a computer program for forming a wire created in a digital computer by:

(a) creating a design file containing shape and dimensions of said article;

(b) creating a tool path effective to form the article defined by said design file; and (c) establishing control commands effective to form said wire and embedding the control commands in the tool path.

14. A method as recited in claim 2 wherein said flow of particulate material into said deposition zone, energy density of said laser beam, and speed of movement of said deposition zone along said deposition path are controlled by a computer program for forming a wire created in a digital computer by:

(a) creating a design file containing shape and dimensions of said article;

(b) creating a tool path effective to form the article defined by said design file; and
(c) establishing control commands effective to form said wire and embedding the control commands in the tool path.

15. A method as recited in claim 13 wherein said design file is created by use of a computer-aided design program.

16. A method as recited in claim 14 wherein said design file is created by use of a computer-aided design program.

17. A method as recited in claim 13 wherein said tool path with embedded control commands is created by use of an adapted computer-aided manufacturing program.

18. A method as recited in claim 14 wherein said tool path with embedded control commands is created by use of an adapted computer-aided manufacturing program.

19. A method as recited in claim 1 further characterized in that:
(a) shape and dimensions of said wire are defined in a digital design file created by use of a computer-aided design program;
(b) a digital cutter location file is created using said design file and an adapted computer-aided manufacturing program;
(c) a digital post-processor specific to laser deposition apparatus is created;
(d) a digital machine operating file is created by operating upon said cutter location file with said post-processor; and
(e) apparatus for moving the deposition zone along a deposition path and executing the control commands is controlled by a digital computer directed by said machine file.

20. A method as recited in claim 2 further characterized in that:
(a) shape and dimensions of said wire are defined in a digital design file created by use of a computer-aided design program;
(b) a digital cutter location file is created using said design file and an adapted computer-aided manufacturing program;
(c) a digital post-processor specific to laser deposition apparatus is created;
(d) a digital machine operating file is created by operating upon said cutter location file with said post-processor; and
(e) apparatus for moving the deposition zone along a deposition path and executing the control commands is controlled by a digital computer directed by said machine file.

21. A method as recited in claim 1 wherein computer numerical control apparatus is used to move said deposition zone along said deposition path.

22. A method as recited in claim 2 wherein computer numerical control apparatus is used to move said wire away from said deposition zone.

23. A method as recited in claim 1 wherein powder composition is varied during formation of a wire.

24. A method as recited in claim 2 wherein powder composition is varied during formation of a wire.

25. A method as recited in claim 1 wherein at least two powder paths are utilized.

26. A method as recited in claim 2 wherein at least two powder paths are utilized.

27. A method as recited in claim 25 wherein said powder paths are arranged in pairs, and a first path of a pair is oriented about 180 degrees from a second path of the pair.

28. A method as recited in claim 26 wherein said powder paths are arranged in pairs, and a first path of a pair is oriented about 180 degrees from a second path of the pair.

29. A method as recited in claim 1 wherein a wire of variable density is formed.

30. A method as recited in claim 2 wherein a wire of variable density is formed.

31. A method as recited in claim 1 wherein said control commands comprise commands to:
(a) ramp up laser power;
(b) turn on flow of particulate material;
(c) turn on gas flow;
(d) move deposition head to location where deposition is to begin;
(e) open laser shutter;
(f) dwell in said location for a time sufficient to create a molten pool and begin deposition;
(g) move laser head relative to molten pool while continuing deposition;
(h) close laser shutter;
(i) move deposition head away from wire formed;
(j) turn flow of particulate material off;
(k) turn gas flow off; and
(l) ramp down laser power.

32. A method as recited in claim 2 wherein said control commands comprise commands to:
(a) ramp up laser power;
(b) turn on flow of particulate material;
(c) turn on gas flow;
(d) move deposition head to location where deposition is to begin;
(e) open laser shutter;
(f) dwell in said location for a time sufficient to create a molten pool and begin deposition;
(g) move wire being formed relative to molten pool while continuing deposition;
(h) close laser shutter;
(i) move wire formed away from deposition head;
(j) turn flow of particulate material off;
(k) turn gas flow off; and
(l) ramp down laser power.

33. An apparatus for forming a wire from materials in particulate form, said apparatus comprising:
(a) a means for defining the shape and dimensions of a wire, said means being capable of creating control commands effective to form a wire by depositions of molten material along a deposition path in a single axis;
(b) a feed mechanism for introducing particulate material into a deposition zone;
(c) a laser positioned to focus a laser beam into said particulate material in said deposition zone;
(d) a supporting and drawing device for moving said wire away from said deposition zone; and
(e) a controller for controlling flow of said particulate material, energy density of said laser beam, focal position of said laser beam, and speed of withdrawal of wire being formed from said deposition zone by using said control commands.

34. An apparatus for forming an wire from materials in particulate form, said apparatus comprising:
(a) a means for defining the shape and dimensions of a wire, said means being capable of creating control commands effective to form a wire by depositions of molten material along a deposition path in a single axis;

(b) a feed mechanism for introducing particulate material into a deposition zone;

(c) a laser positioned to focus a laser beam into said particulate material in said deposition zone;

(d) a supporting device for holding said wire in said deposition zone;

(e) a means for moving said deposition zone along said deposition path away from said wire;

(f) a controller for controlling flow of said particulate material, energy density of said laser beam, focal position of said laser beam, and speed of withdrawal of said deposition zone from wire being formed by using said control commands.

\* \* \* \* \*